Patented Mar. 6, 1923.

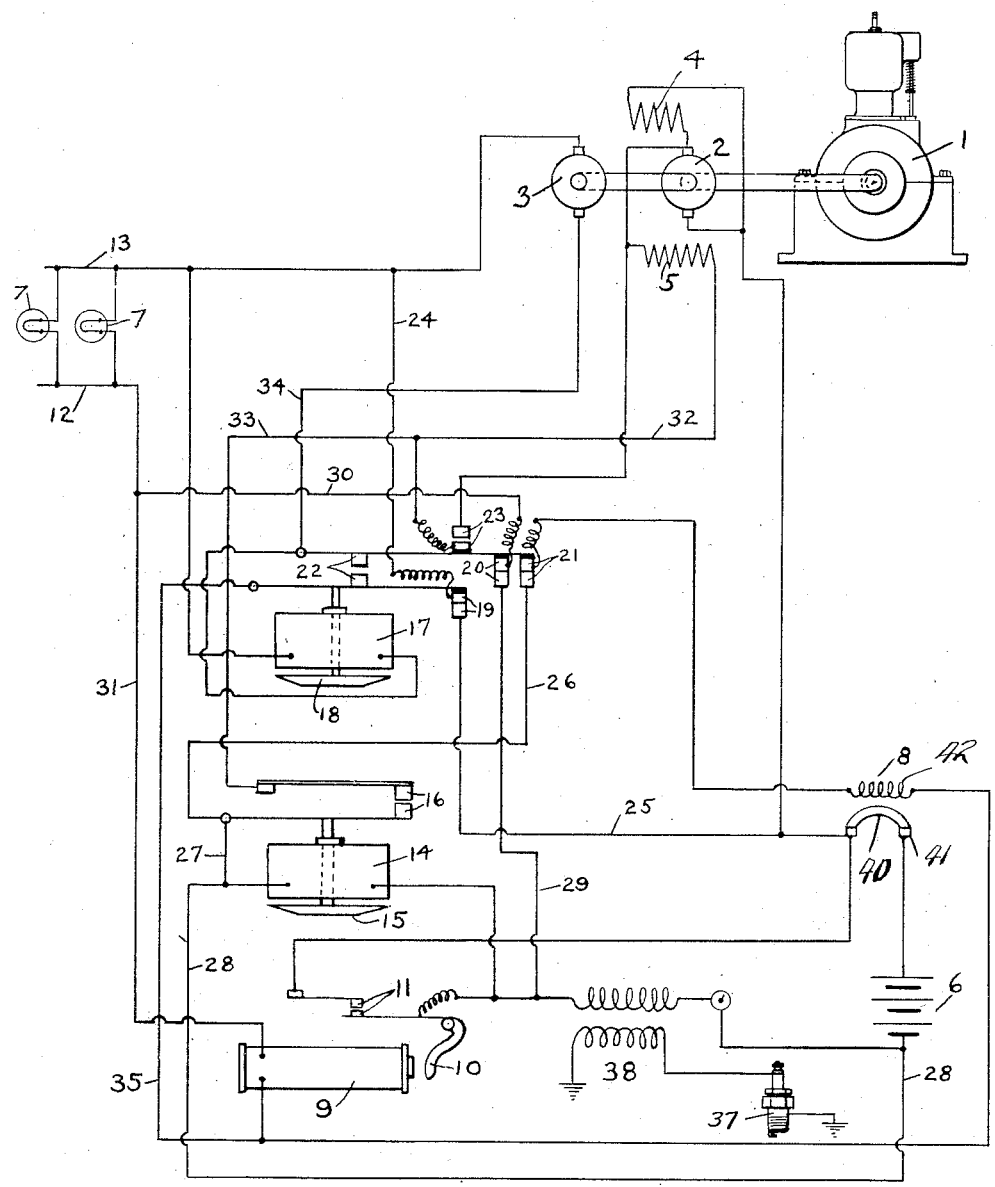

1,447,480

UNITED STATES PATENT OFFICE.

SCOTT J. MATTHEWS, OF PORT CLINTON, OHIO.

ELECTRIC SYSTEM.

Application filed March 7, 1917, Serial No. 153,015. Renewed July 31, 1922. Serial No. 578,853.

*To all whom it may concern:*

Be it known that I, SCOTT J. MATTHEWS, a citizen of the United States, and a resident of Port Clinton, in the county of Ottawa and State of Ohio, have invented a certain new and useful Electric System; and I do hereby declare the following to be a full, clear, and exact description of the invention, such as will enable others skilled in the art to which it appertains to make and use the same, reference being had to the accompanying drawing, and to the characters of reference marked thereon, which form a part of this specification.

My invention relates to electric systems. It particularly relates to small electric systems used for lighting, heating, power, etc., and for what might be termed individual consumption, as distinct from public supply systems. It has for its main object to greatly simplify such systems and reduce the cost of production and consequently the cost of installation and the cost of maintenance to a minimum. It also has for its object to obviate the use of large and expensive storage batteries and produce a current of the desired potential or voltage. Another object of my invention is to produce the desired current without operation of any switch or mechanism other than closing of the switch of the lamp or other translating device that it is desired to have electrically operated; to produce a system that will automatically control the source or sources of power supply without further operation by the operator than merely closing the switch of the device to be electrically supplied. By my invention I provide a system for generating relative high potential electric currents by means of a generator directly connected to an internal combustion engine, which is started by a low voltage dynamo operating as a motor being driven by a current from a storage battery which is charged by the low voltage generator when the engine is started; the low voltage starting dynamo having a series field to produce a large starting torque. The series field may be subsequently cut out or the current therethrough be greatly reduced. In the preferred form of the invention the two dynamos are combined as one, the low and high voltage being obtained from a common field excitation and by using two sets of commutating means and armature coils or by commutation at two sets of points in the armature coils. The arrangement to secure production of high and low voltage currents may be greatly varied by those skilled in the art without departing from the spirit of the invention. Other features and advantages are produced by my invention which will appear or suggest themselves from the following description and from the drawing.

The invention may be contained in many forms of systems, usable for different purposes. I have selected for purposes of illustration one form of a system embodying the invention, which is shown in the drawing and described hereinafter.

The figure shown in the drawing diagrammatically illustrates an electric lighting system in which is produced the usual 110 volt difference between the mains and which receives the power consumed direct from an internal combustion engine.

1 is a gas engine which is directly connected to a dynamo machine which is provided with an armature winding 3 that operates as a generator winding and an armature winding 2 that operates either as a generator winding or a motor winding. The commutating means connected to the armature winding 2 collects seven or eight volts from the armature coils and the commutating means connected to the armature winding 3 collects 110 volts when operating at the proper speed. The dynamo part 2 operates to charge a storage battery 6, when acting as a generator, and to rotate the crank-shaft of the engine 1, when operating as a motor, receiving current from the storage battery 6. The generator part 3 supplies the current to the electric lamps 7, or other translating devices which may be connected to the main supply lines of the system. The generator is provided with a common field produced by the field coils 4 and 5, respectively, shunt and series field coils. During the starting of the engine the current through the series coil is large to produce a large starting torque to overcome the engine compression and then the series field coil may be shunted to greatly reduce the current passing through it when the engine is started. The current to the field coils is supplied by the storage battery in starting. Subsequently the voltage of the shunt field is kept constant by the battery potential.

Intermediate the winding 2 and the storage battery 6 is located an automatic time-limit circuit-breaker 8 that may be of any suitable form, that operates to open the circuit of the storage battery at the expiration of a predetermined time or predetermined consumption of battery current, which prevents the battery from becoming completely discharged by failure of the dynamic machine 2 to start the engine 1. I have shown the time-limit circuit-breaker 8 conventionally to illustrate its points of connection in the system. It has a coil 42 and a snap opening switch having the movable contact 40 and the fixed contacts 41 that are connected to the circuit to be controlled.

9 is a main controlling magnetic switch having an armature 10 and contacts 11. It operates to complete a holding circuit through itself, upon completing a connection across the main lines 12 and 13 and through any one of the lamps or other device connected to the supply. It also causes a circuit-controlling magnetic switch 14 to complete the circuit through the generator-motor part 2. The main controlling switch 9 is so constructed that the small current that may be impressed by the storage battery 6 through one of the 40 watt lamps 7 will operate the switch and cause it to relay the magnet of the magnetic switch 14. It also completes the circuit to the engine ignition system.

The magnetic switch 14 is provided with an armature 15, which operates to close contacts 16, to cause the armature winding 2 to start the engine 1. If the engine operates within the time limited by the time-limit circuit-breaker 8, it will rotate the armature at speed to produce 110 volts in the winding 3. The armature winding 3 is connected to a restoring magnetic switch 17, which is so made that it operates only when the potential of the winding 3 reaches a predetermined point, preferably 110 volts. The magnetic switch 17 is provided with an armature 18, which is so weighted and spring-controlled as to operate only when a predetermined number of lines of force have been established in the magnetic circuit of the magnetic switch. The magnetic switch 17 is provided with contacts 19, 20, 21, which are normally closed, and contacts 22 and 23, which are normally open. The contacts are supported on springs which tend to counteract the effect of magnetization of the magnet and cooperate with the weight of the armature to restore the switch when the magnet is de-energized.

The magnet of the magnetic switch 9 is connected to the main line 12. The circuit may be completed through one of the translating devices 7 to the main line 13, which is connected through the line 24 to the contacts 19, the circuit-breaker 8, through the line 25, to one side of the storage battery 6. The magnet of the magnetic switch 9 is also connected to the opposite side of the storage battery 6 through the coil of the time-limit circuit-breaker 8 to the contacts 21, thence through lines 26, 27 and 28 to the storage battery 6. When the circuit through one of the translating devices 7 is closed, the magnet of the main controlling magnetic switch 9 is energized, which closes the contacts 11. This short circuits the connection established through the translating device 7 and between the storage battery 6 and the magnetic switch 9, since it completes a connection directly from the storage battery 6 to the contacts 11, through the line 29 to the contacts 20, the lines 30 and 31 to the magnetic switch 9. Thence the current flows as before, through coil of the circuit-breaker 8, to the contacts 21, lines 26, 27, 28 to the opposite side of the battery. It also completes a circuit from the storage battery 6 through the circuit-breaker 8, contacts 11, to the magnetic controlling switch 14. Thence the current flows to the other side of the storage battery, through the line 28.

The magnet of the magnetic controlling switch 14 is energized, which closes the contacts 16. This completes a circuit from the storage battery through the armature winding 2, and it starts the engine 1. The current flows from the battery 6, through the circuit-breaker 8, the armature winding 2, the series-field 5, lines 32 and 33, through contacts 16, lines 27 and 28. The generator-motor part 2 then starts the engine 1, to which is also connected the generator 3.

When the armature winding 3 reaches the predetermined potential, that is, when the engine 1 reaches a certain speed beyond the speed-limit that may be produced by the armature winding 2, and so that about 110 volts will be commuted from the winding 3, the magnet of the magnetic switch 17 is energized sufficiently to cause the armature 18 to open first contacts 19 and then contacts 20 and 21, and to close in sequence the contacts 22 and 23. This will open the circuit through the time-limit controlling coil of the circuit-breaker 8, which is normally connected through the contacts 21. It will also open the short circuit of the translating devices 7 through the contacts 20. It also opens the connection from the storage battery 6 to the main line 13 through contacts 19, which was originally used to establish a connection through the magnet of the magnetic switch 9. It closes the contacts 23, which shunts the greater part of the current across the terminals of the series-field coil 5 of the armature winding 2, and thus reduces the current through the series-field coil 5 to a small fraction of that used in cranking or starting the motor. It also closes the contacts 22, which completes the circuit from the winding 3 through the line 34, contacts 22, line 35, to the magnet of the magnetic switch 9, to the line 12, through the translating device 7, to the line 13, thence to the winding 3.

The winding 2 being connected to the storage battery 6, through the circuit-breaker 8 on one side and through the series-field coil 5, and its shunt through contacts 23, line 33, contacts 16, lines 27 and 28 to the other side, and being driven by the engine operating at a high speed, it will charge the storage battery after the manner well known in the art, until the potential of the battery reaches that produced in the winding 2, whereupon the two will be substantially balanced, the counter electro-motive force of one substantially counter-balancing the electro-motive force produced by the other. The winding 3 will thus continue to supply the translating devices 7, until their switches are opened, whereupon the circuit through the magnet of the magnetic switch 9 is opened. The armature of the magnetic switch is connected to the primary of the ignition coil 38. The secondary of the induction coil is connected to the spark plugs of the engine. A suitable circuit breaker is provided for producing a spark. Any other suitable arrangement may be provided for the ignition of the engine, the arrangement being such that the ignition is controlled by magnetic switch 9. This opens the sparking or ignition circuit of the engine and the engine stops. This restores the magnetic switch 17 to normal condition. Also, the magnetic switch 14 returns to normal when the contacts 11 are opened.

I claim:

1. In an electric system, the combination of a generator, an electric supply system connected to the generator, a generator-motor having a series field winding, an internal combustion engine connected to the said generator and generator-motor, means for causing the generator-motor to start the engine and means controlled by the generator for reducing the current in the series field of the generator-motor.

2. In an electric system a dynamic machine, an armature having a generator winding and a generator-motor winding, an electric supply system connected to the generator winding, an internal combustion engine connected to the armature, the generator and generator-motor windings having a common field, translating devices connected to the generator winding, a storage battery connected to the translating device, means controlled by the circuit of a translating device for completing the circuit of the generator motor winding to the storage battery to start the engine.

In testimony whereof, I have hereunto signed my name to this specification.

SCOTT J. MATTHEWS.